(12) United States Patent
Hüttlin

(10) Patent No.: US 6,358,290 B1
(45) Date of Patent: Mar. 19, 2002

(54) PROCESSING APPARATUS WITH FILTER

(76) Inventor: h.c. Herbert Hüttlin, Rümminger Strasse 15, D-79539 Lörrach (DE)

( * ) Notice: Subject to any disclaimer, the term of this patent is extended or adjusted under 35 U.S.C. 154(b) by 0 days.

(21) Appl. No.: 09/704,317

(22) Filed: Nov. 2, 2000

Related U.S. Application Data

(63) Continuation of application No. PCT/EP99/03026, filed on May 4, 1999.

(30) Foreign Application Priority Data

May 5, 1998 (DE) .......................... 198 19 980

(51) Int. Cl.[7] .............................. B01D 46/00
(52) U.S. Cl. .................. 55/283; 55/302; 55/502; 55/525; 55/529; 55/498; 95/281; 210/493.1; 210/493.5
(58) Field of Search ................. 55/301, 302, 498, 55/502, 522, 529, 283, 525, 385.2, DIG. 18, DIG. 46; 95/280, 281; 210/493.1, 493.5

(56) References Cited

U.S. PATENT DOCUMENTS

| | | | |
|---|---|---|---|
| 4,390,428 A | 6/1983 | Bratten | 210/400 |
| 4,430,223 A * | 2/1984 | Miyakawa et al. | 210/493.5 |
| 4,439,321 A * | 3/1984 | Taki et al. | 210/493.1 |
| 4,548,626 A | 10/1985 | Ackley et al. | 55/316 |
| 4,619,675 A | 10/1986 | Watanabe | 55/498 |
| 4,799,944 A * | 1/1989 | Dixon et al. | 55/529 |
| 4,953,308 A | 9/1990 | Basten et al. | 34/82 |
| 5,178,652 A | 1/1993 | Huettlin | 55/96 |
| 5,444,892 A | 8/1995 | Ris et al. | 15/304 |
| 5,512,076 A * | 4/1996 | Gibson | 55/302 |
| 5,616,171 A * | 4/1997 | Barris et al. | 55/302 |
| 6,200,368 B1 * | 3/2001 | Guerin et al. | 55/497 |

FOREIGN PATENT DOCUMENTS

| | | |
|---|---|---|
| DE | 3515641 | 10/1985 |
| DE | G8427328. 3 | 10/1985 |
| DE | 4030086 | 12/1991 |
| DE | 4117550 | 12/1992 |
| DE | 19819980 | 11/1999 |
| EP | 0409402 | 1/1990 |
| EP | 0572356 | 12/1993 |
| GB | 2098317 A * | 11/1982 |
| WO | WO87/01958 | 4/1987 |
| WO | WO87/04945 | 8/1987 |

* cited by examiner

*Primary Examiner*—David A. Simmons
*Assistant Examiner*—Minh-Chau T. Pham
(74) *Attorney, Agent, or Firm*—St. Onge Steward Johnston & Reens LLC

(57) ABSTRACT

A processing apparatus is provided, particularly a granulating or coating apparatus. A filtering assembly is arranged above or adjacent a processing chamber for removing dust from process air containing a particulate material. The filtering assembly includes at least one filter which is passed by the process air coming from the processing chamber. The filter includes a plurality of filter surfaces arranged adjacent to one another to form a substantially circular filter body. The filter surfaces extend substantially radially and in meander-like geometry to be inclined with respect to the process air flow.

25 Claims, 7 Drawing Sheets

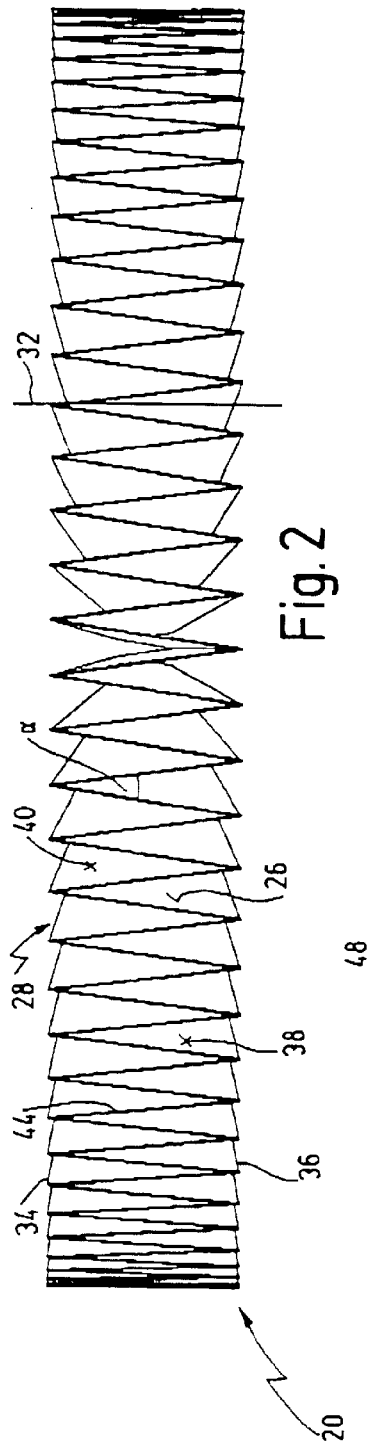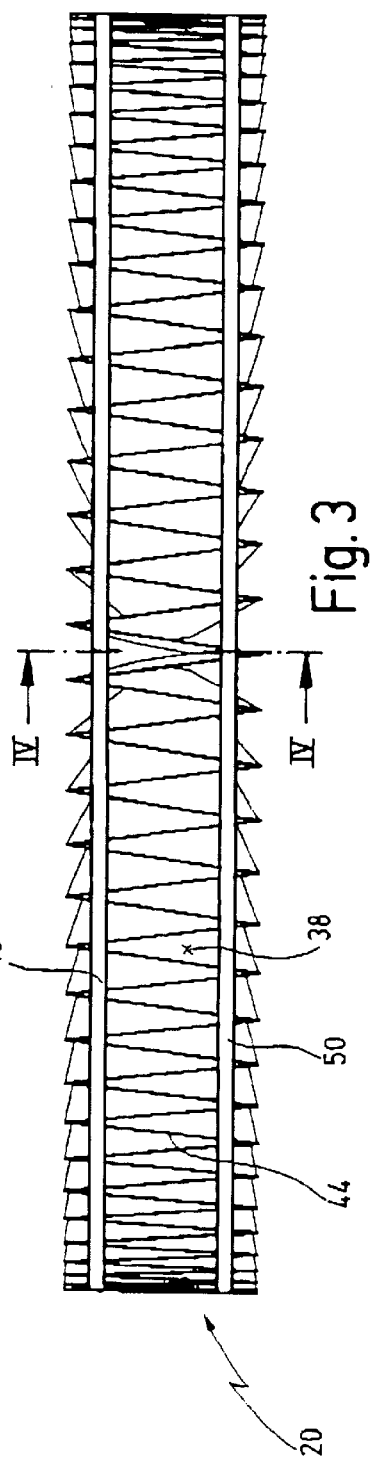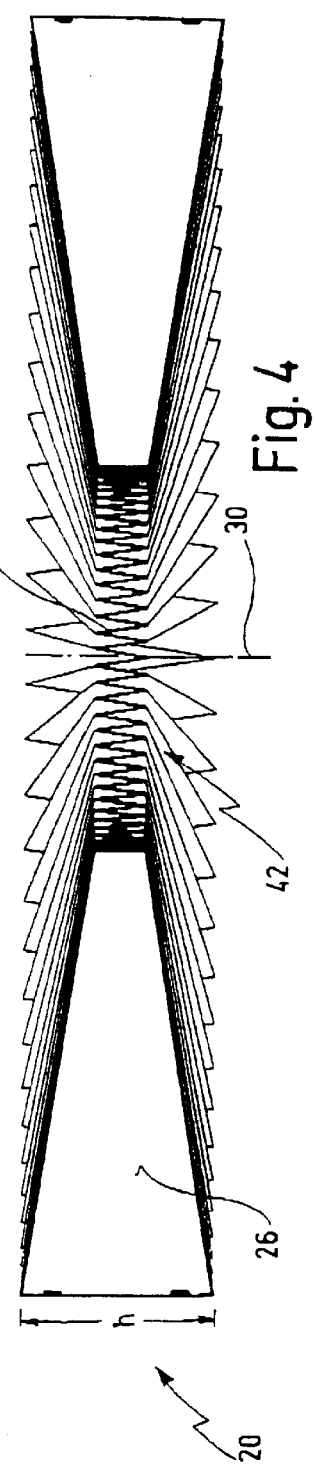

PROCESSING APPARATUS WITH FILTER

CROSS REFERENCE TO PENDING APPLICATION

This application is a continuation of pending International Application PCT/EP99/03026 filed on May 4, 1999 which designates the United States.

BACKGROUND OF THE INVENTION

The invention relates to a processing apparatus, especially a granulating or coating apparatus, comprising a filtering assembly arranged above or adjacent to a processing chamber for removing dust from process air containing particulate material. The filtering assembly comprises at least one filter through which the process air flows from the processing chamber.

A processing apparatus of the mentioned type is known from the German patent DE 40 30 086. In such processing apparatus the process air flowing in the apparatus is used as a carrier medium for uniform distribution or for fluidizing the particulate material in the processing chamber. When passing through the filtering assembly for removing dust it is necessary to separate the particulate material from the process air so that the process air after filtering departs from the apparatus free of dust. The filter however not only has the purpose of removing dust, but also serves to retain particulate material in the processing chamber and optionally return it to the process itself.

A special application relates to a granulating apparatus. Small particles nearly the size of dust are agglomerated into larger particles in the processing chamber. The fluidized particle-like material is treated with a fine spray of liquid, which promotes agglomeration of the individual particles.

Another special application is the so-called coating process. A surface coating is formed on the particulate material suspended in the processing chamber in the process air by means of a liquid spray.

The process air in such apparatus is guided from the processing chamber in the lower region of the apparatus upwardly or sidewardly through the filtering assembly, for example by generating a corresponding vacuum in an exhaust chamber located above or adjacent to the processing chamber. The particulate material is retained by the filtering assembly and therefore cannot escape the processing chamber.

Depending on the properties of the particulate material, which can be present in the form of powder, pellets or granules, a portion of the material adheres to the filter or filters of the filtering assembly. Generally, the tendency to adhere is larger for finer, wetted or sticky particles than it is for larger or dry particles.

Due to the more or less pronounced tendency of the material to adhere to the filter or filters of the filtering assembly, it is necessary to free the filter or filters during the go process from deposited particulate material to avoid the filter from becoming impermeable to the process air and the process air flow being strongly reduced or even blocked. In addition, the deposited material removed from the filter or filters should be returned to the process. After completing a process and before beginning a new process, the filter or filters must be disassembled from the apparatus for complete cleaning for example with a washing fluid. A thorough cleaning is necessary, especially when a different particulate material is used in the subsequent process.

The apparatus disclosed in DE 40 30 086 comprises a filtering assembly having several filter cartridges arranged in a circle at the same elevation. Each filter cartridge consists of a vertically extended filter basket composed of a metal frame. A fabric filter sack is drawn over the basket as the filter medium, which forms the filter surface of the filter cartridge. The filter basket comprises a cylindrical outer portion and a cone-shaped inner portion.

A disadvantage of this filter cartridge is its considerable construction height. Because of this, the air space available for the processing chamber located below the filtering assembly is small for the given height of the apparatus. The active surface of each filter extends deeply into the processing chamber due to the filter construction, where the load on the filtering surface of each cartridge is particularly high. The filtering surface in the lower region of the filter cartridge is very strongly subjected to particulate material contained in the process air.

However, the considerable height of the known filter is necessary to achieve a sufficiently large active filtering surface, which makes a high through-put possible and maintains a sufficiently strong air flow for the process.

An air filter arrangement for an aspiration device is disclosed in the German patent application DE 35 15 641, which comprises a radially folded filter element with a number of folds. The German utility model DE 84 27 328 discloses an air filter for a vacuum cleaner, where the air filter has a bonnet-like or a bell-like shape. The filter includes a folded filter surface.

A plate filter is disclosed in the German patent application DE 41 47 550 formed of a web material folded in zig-zag shape, whose individual fold lines or filter surfaces run in a direction parallel to one another. This known plate filter is used for filtering the interior space of a motor vehicle.

An object of the present invention is to provide an improved processing apparatus of the above-mentioned type having a relatively enlarged processing chamber but without enlarging the processing apparatus on the whole.

SUMMARY OF THE INVENTION

According to the present invention the afore-mentioned object is achieved by a processing apparatus, comprising:
a processing chamber;
a filtering assembly arranged adjacent said processing chamber for removing dust from process air containing particulate material, said filtering assembly including at least one filter being passed by said process air coming from said processing chamber,
wherein said filter comprises a plurality of filter surfaces arranged adjacently to form a substantially circular filter body, said filter surfaces extending substantially radially and being inclined in meander-like geometry with respect to the flow of said process air, and wherein said filter body and said filter surfaces are made of a metallic multi-layer fabric.

In the processing apparatus according to the present invention, the total active filter surface of the filter can be substantially increased over the known filter cartridge due to the plurality of filter surfaces arranged adjacently in a meandering structure, so that the construction height of the filter and therefore that of the filtering assembly in the processing apparatus can be substantially reduced, while achieving a comparable filtering effect. Due to the plurality of filter surfaces, interconnected in meander-like manner, the total filtering surface can be concentrated into a disk shape space of reduced height. The space available for the process air in the processing chamber is therefore effectively enlarged without constructively enlarging the processing apparatus. In addition, due to the enlarged filtering surface obtained by the meandering of the filter surfaces forming the filter body, a single filter is sufficient to achieve a sufficient filtering of the process air. In contrast, a plurality of filter cartridges are provided to achieve a sufficient filter effect in the prior art. This provides a further advantage in that a substantial reduction in cost is achieved with the processing apparatus of the present invention.

The filter is fabricated from a metallic multi-layer fabric. A metallic multi-layer fabric has the advantage that it is inert and has high chemical resistance. Compared to textile filter media, it also has the advantage of high mechanical stability.

The radially extending filter surfaces, being inclined in meander-like geometry with respect to a vertical line, form in respective pairs steep roof-shaped caverns, open to the bottom, for example substantially v-shaped caverns. It will be understood that "inclined with respect to the process air flow" means that the filter surfaces in mounted condition of the filter are sloped with respect to the main direction of process air flow.

In a preferred embodiment, the filter is arranged substantially horizontally above the processing chamber.

A further advantage here is that the filter surfaces are located at a larger distance from the floor of the processing chamber in a processing apparatus of the same construction height as in the known apparatus. Consequently, the load on the filter is smaller than the filter cartridges of the known apparatus, because the concentration of particulate material in the process air decreases with increased distance from the floor of the processing chamber. The height of the apparatus of the present invention can even be reduced compared to the conventional apparatus. The vertical flow of the process air can be passed to the filter uniformly and nearly free of turbulence, which increases the fall velocity of the particulate material and considerably reduces the load on the filter itself.

In a preferred embodiment, a ratio of the height to the radial extension of the filter surfaces is less than 1.

This ratio is substantially greater than 1 in the filter cartridges of the known apparatus, while in the present invention, the construction height of the filter and also the filter load can be considerably reduced as mentioned. A further advantage is that the process air space in which the particulate material is handled is enlarged and therefore the result of granulating and coating processes are qualitatively and quantitatively improved.

Preferably, the ratio is in the range of about 0.1 to 0.5.

This has the advantage that a very flat filter is provided, which still fulfills the requirement on filtering effect to a sufficient degree.

In a further preferred embodiment, the filter body and the filter surfaces are made of the same material.

This is in contrast to the filter cartridges of the known apparatus having a metallic filter basket and a textile filter sack. The advantage of the present filter is that it is composed of the same medium, i.e. the filter body and the filter medium are made of the same material, which reduces the manufacturing cost of the present filter and in addition simplifies its manufacture. The present filter has a high static stability due to the meander-like geometry, so that a support structure such as the metal basket of the known filter cartridge is not needed.

The present filter can be produced in a simple and inexpensive manner, for example by folding one or more flat circular blanks of the metallic multi-layer fabric along radial folding lines to form a meandering structure. When the filter is formed of several starting blanks, these are welded or glued to one another after folding to form the circular filter body.

In a further preferred embodiment, each individual filter surface tapers in radial direction from the outside to the inside in ray-like manner.

This feature has the advantage that the slope or opening angle between two neighboring filter surfaces remains constant over the entire radial length of the filter surfaces. The advantage is that no twisting or deformation occurs in the filter material which could impair the filter effect. A major portion of the process air in the granulating and coating apparatus flows upwardly in the peripheral region of the processing chamber. Thus the reduced active filter surface toward the center of the filter having approximately trapezoidal-shaped filter surfaces, does not produce a noticeable impairment of the filter effect. In contrast, a reduced slope or opening angle between the filter surfaces toward the center of the filter would have the disadvantage that more particulate matter would be deposited between the more closely adjacent filter surfaces toward the center. Such deposits would be difficult to clean from the narrow gaps between the filter surfaces and precisely this is avoided.

In a further preferred embodiment, the intermediate spaces between neighboring filter surfaces are radially open at the outer periphery of the filter.

The feature has the advantage that the filter body apart from the meandering filter surfaces has no further surfaces, which would hinder a thorough cleaning of the filter after a process, so that the cleaning properties of the filter are further improved. The filter can easily be cleaned with a washing fluid after completing a process, where the washing fluid can flow outwardly from the cavern-like intermediate spaces formed between the filter surfaces.

In a further preferred embodiment, at least one ring is connected at the outer circumference with the end edges of the filter surfaces, where the width of the ring is smaller than the height of the end edges of the filter surfaces.

The at least one ring has the advantage of providing further form stability to the filter, where the small width of the ring allows the intermediate spaces between the filter surfaces to be substantially radially open at the end edges. The at least one ring can be formed for example of a thin ring band. Preferably, two radially spaced rings are provided for stabilizing the filter which are adhered or welded to the end edges.

In a further preferred embodiment, the filter surfaces are formed to have a concave curvature in the flow direction of the process air.

This feature has the advantage that the intermediate spaces between the filter surfaces on the side facing the processing chamber, i.e. the filter-active side of the filter has a larger filtration space. The upward velocity of the process air containing the particulate material is reduced due to the larger cross-section of the intermediate spaces between the filter surfaces, whereby the load on the filter is advantageously reduced.

In a further preferred embodiment, the filter comprises a central closeable opening.

Since the process air as mentioned flows upwardly substantially in the peripheral region of the processing apparatus, the center of the filter is only slightly passed by the process air and is therefore inactive as a filter. The opening at the center of the filter however allows the possibility of positioning a pneumatic or electric agitator, which shakes the filter during the process to shake off the particles adhering to the filter surfaces. If such an agitator is not employed, the opening can be tightly closed by a cover adapted to the opening.

In addition, the opening at the filter center simplifies the production of the meandering geometry of the filter surfaces by folding a metallic multi-layer fabric. The diameter of the opening can be 10 to 30% of the total diameter of the filter. Preferably the filtering assembly comprises one filter whose diameter corresponds approximately to the diameter of the processing chamber.

This feature has the advantage that the assembly of the filtering assembly in the processing apparatus as well as disassembly is substantially simplified, while the processing apparatus known from the prior art comprises a filtering assembly with a total of 4 to 10 filter cartridges, which require a corresponding increase in assembly work. Furthermore, the costs of the processing apparatus according to the present invention are reduced, because the complicated and costly support plates for several conventional filter cartridges in the known processing apparatus can be relinquished.

In a further preferred embodiment, where the filter comprises a central opening, a driving means for agitating the filter is arranged in the opening of the filter.

This feature has the advantage that a constructively simple possibility is provided for cleaning the filter, especially one which operates continuously. In addition to the lesser tendency of the particles adhering to the filter, the means for agitating the filter reduce the adherence further, because the agitated filter throws off a portion of the particles back into the processing chamber. A sufficient cleaning and return of larger and substantially non-adhesive particles is achieved to a satisfactory extent during the process. The drive of the agitating means is preferably electric or pneumatic.

In a further preferred embodiment, the filtering assembly comprises a circumferential first seal for sealing an outer circumference of the filter against an inner wall of the processing chamber, where the seal is removable from the filter.

This feature has the advantage that the seal can be removed from the filter after completing the process, where the filter can be assembled and disassembled and cleaned in a simpler and faster manner.

In a further preferred embodiment, when the filter has a central opening, the filtering assembly comprises a circumferential second seal for sealing an inner circumference of the at least one filter, where the seal is removable from the filter.

This feature also has the advantage that the filter body can be completely opened after completing a process, where the cleaning properties of the filter are further improved.

In a further preferred embodiment, the first seal and/or second seal are radially elastically expandable and comprise a hollow space which can be supplied with compressed air.

This feature has the advantage that on the one hand a highly effective seal is achieved between the filter and the inner wall of the processing apparatus due to the pneumatic force of the seal, because the seal is pressed against the inner wall and against the filter with high pressure. On the other hand, the pneumatic seal allows a rapid and simple assembly and disassembly of the filter in the processing apparatus. By applying compressed air to the hollow space in the seal, the first or second seal expands elastically in radial direction and presses against the outer circumference or the inner circumference of the filter on the one hand and against the inner wall of the processing apparatus or the cover at the center of the filter on the other hand. The pressure in the hollow space of the first or second seal is released to remove the filter, where the seal contracts elastically and can be removed from the filter.

In a further preferred embodiment, the first seal and/or the second seal comprise a circumferential separation joint, which allows a vertical shifting of the filter when exceeding a threshold value of a force acting in the vertical direction.

The feature has the advantage that if a blow-out occurs in the processing chamber, energy can be removed from the resulting pressure wave by vertical displacement of the filter, where it is then prevented that the processing apparatus would burst and a danger would arise to the operating personnel.

In a further preferred embodiment of the processing apparatus, the filtering assembly comprises radially displaceable securement elements for securing the filter in the processing apparatus.

The ease of operation of the present processing apparatus when mounting and dismounting the filter is further improved. For example, three to six such securement elements can be provided on the inner wall of the processing apparatus and are distributed about its circumference. The securement elements are preferably moveable in radial direction via pneumatic control, where the securement elements are preferably formed as carrier elements.

In a further preferred embodiment, means are provided above the filter for clearing the particulate material from the filter during a process.

This feature is of particular advantage when the process air includes very fine, especially sticky or moist particles, which have a high tendency to adhere to the filter. The means for clearing particulate material during the process enable an improved recovery of the material in the processing chamber.

Preferably, the clearing means comprise at least one rotatable arm which can be supplied with compressed air, whose length corresponds approximately to the radial extension of the filter surfaces and whose underside comprises at least one air outlet nozzle.

This feature has the advantage that a continuous cleaning of the filter is achieved during the running process, without the process airflow upwardly through the filter having to be interrupted for a cleaning. In the known processing apparatus in contrast, some of the filter cartridges are blocked off from the process air flow at regular intervals for cleaning the filter sacks and are subjected to the flow of a cleaning gas in opposite direction. The present arm is preferably configured to extend over a pair of filter surfaces of the filter, so that a large portion of the filter surfaces always remains subject to the passage of process air.

In a further alternative embodiment, the clearing means comprise a rotatable arm having a profile such that a downwardly directed pressure wave is generated by rotation of the arm.

This feature has the considerable advantage that no additional air flow is required, for example a cleansing gas, for removing particles from the filter. Moreover, a pressure wave is generated by rotation of the arm between the at least one arm, preferably provided in the form of an inclined rotor blade, which continuously reverses the process air stream passing through the filter. Since the supply of external cleansing air is not required, contamination of the particulate material being treated in the processing chamber is advantageously avoided. Furthermore, the costs of the processing apparatus according to the present invention are further reduced, because the cost-intensive treatment equipment for the supply of cleansing air can be relinquished.

In a further preferred embodiment, means for washing the filter are provided above the filter including a washing fluid.

This feature has the advantage that the filter does not need to be disassembled for washing between two processes, especially those involving the same particulate material, but can be washed in situ in the apparatus. It is sufficient that the above-mentioned seals be removed before washing the filter to also be able to clean the outer end edges of the filter surfaces. The washing means can also be used to bind the dustlike particles to the filter before disassembling, so that the material does not fall off and the operating personnel does not come into contact with the material.

The washing means preferably comprise a rotatable spray arm having at least one outlet for washing fluid on its underside.

This feature has the advantage that the washing means are constructively simple and inexpensive to manufacture. The outlet can be configured such that the filter can be selectively cleaned with a fluid jet, a fluid spray or with a surge of fluid.

In a further preferred embodiment, the washing means are integrated with the clearing means.

This feature has the advantage that the space requirement for the clearing means and the washing means is small, where only a small obstruction to process air flow is present above the filter. A further advantage is that the at least one spray arm of the washing means can be used for the inner cleaning of the clearing means. A further advantage is that only one drive mechanism is needed for both means.

Further advantages result from the following description and the attached drawings. It will be understood that the abovementioned features and those to be discussed below are applicable not only in the given combinations, but may also be used in other combinations or taken alone without departing from the scope of the present invention.

Embodiments of the inventions are illustrated in the drawings and will be discussed in more detail in the following.

BRIEF DESCRIPTION OF THE DRAWINGS

FIG. 2 shows a filter of the filtering assembly in the processing apparatus of FIG. 1.

FIG. 3 shows the filter of FIG. 2 with rings attached to the outer circumference of the filter for form stability.

FIG. 4 shows a cross-section of the filter in FIG. 3 along the line IV—IV in FIG. 3.

DETAILED DESCRIPTION OF PREFERRED EMBODIMENTS

Figure 1:
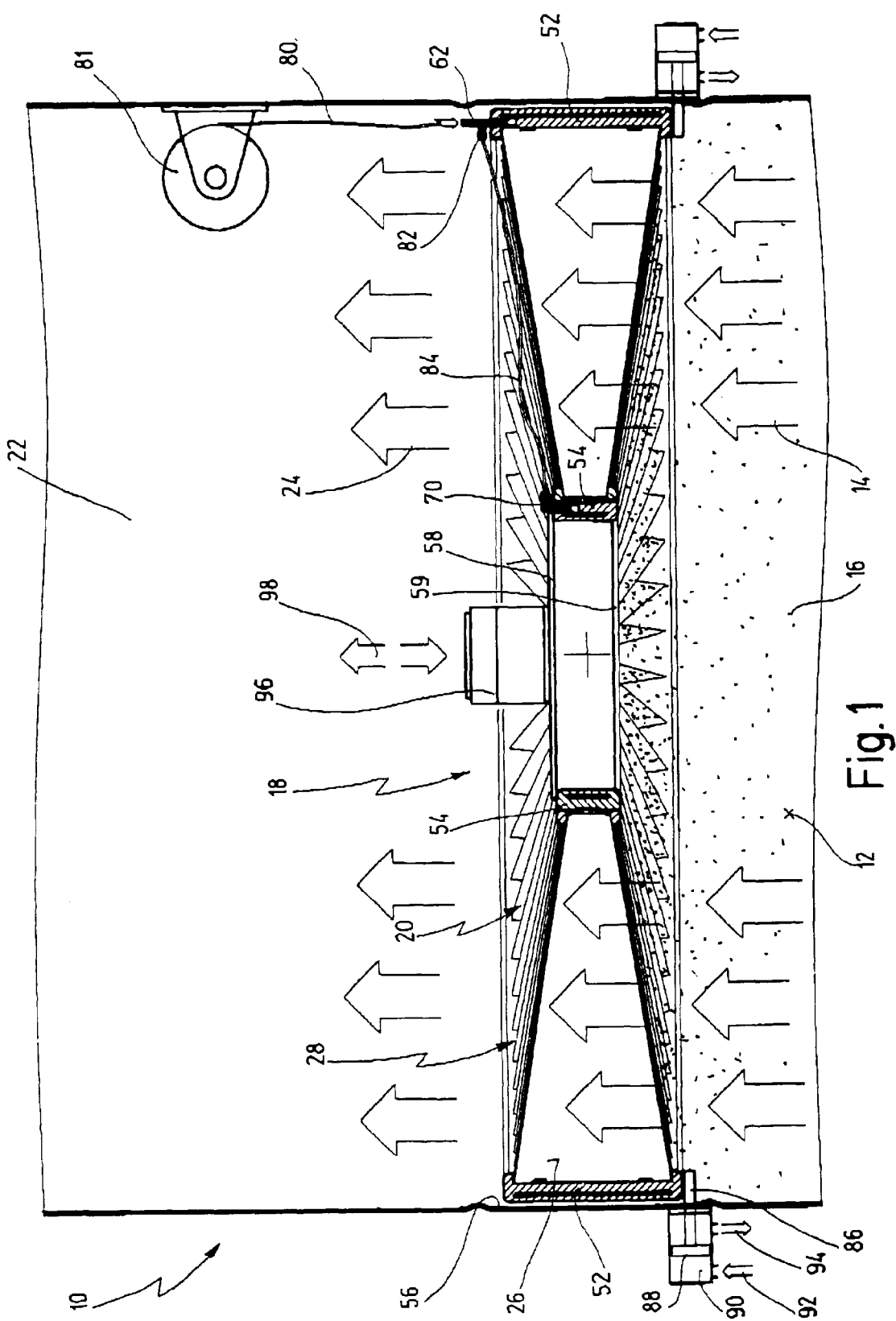
FIG. 1 shows a vertical cross-section of a processing apparatus in the region of a filtering assembly.

Portions of a processing apparatus are shown in FIG. 1, generally designated with the numeral 10. As an example, the processing apparatus 10 can be a coating or granulating apparatus. The processing apparatus 10 is substantially cylindrical on the whole.

The processing apparatus 10 comprises a processing chamber 12 in which the process air 14 flows substantially in vertical direction. The process air 14 contains particulate material 16, which is transported in the process chamber 12 by means of flowing process air 14 and is thereby subjected to a treating process. The treating process takes place substantially in the lower region not illustrated in FIG. 1, while FIG. 1 shows the upper region of the processing chamber 12.

When the processing apparatus 10 is a granulating apparatus, the particulate material 16 comprising very fine particles is agglomerated in the processing chamber 12 to become larger particles. The particulate material 16 is treated with a fine spray of fluid which favors the agglomeration of the individual particles.

When the processing apparatus 10 is a coating apparatus, a surface coating is applied to the particulate material 16 transported in the processing chamber 12 with the process air 14 by spraying a fluid into the processing chamber 12.

The processing apparatus 10 comprises a filtering assembly 18 including a filter 20 through which the process air 14 flows upwardly and thereafter enters an exhaust chamber 22 as purified, filtered air. When passing the process air 14 through the filter 20, the particulate material 16 is retained by the filter 20 in the processing chamber 12.

As can be taken from FIG. 1, the processing apparatus 10 comprises only one such filter 20, where the diameter of the filter 20 corresponds to the diameter of the processing chamber 12. In addition, the filter 20 is generally arranged to be flat in the apparatus 10. The filter 20 therefore has a large spacing to the floor of the processing chamber 12, not shown in FIG. 1. In the lower region of the processing chamber 12, not shown in the figure, the process air 14 is turbulent, while in the region close to the filter 20 it is substantially laminar, so that the particulate material 16 is less subject to abrasion in this region compared to the lower region.

In the following, the filter 20 will be described in more detail with reference to FIGS. 2 to 9. The filter 20 comprises a plurality of filter surfaces 26. The filter surfaces 26 are arranged adjacent to one another to form a substantially circular filter body 28 (see FIG. 7). Each of the filter surfaces 26 extends substantially radially with respect to a vertical center axis 30 of the filter 20.

The individual filter surfaces 26 together form a meanderlike geometry of the filter body 28 where the surfaces are inclined with respect to a vertical line 32, which runs substantially parallel to the direction of gravity and to the flow direction of the process air 14.

Figure 5:
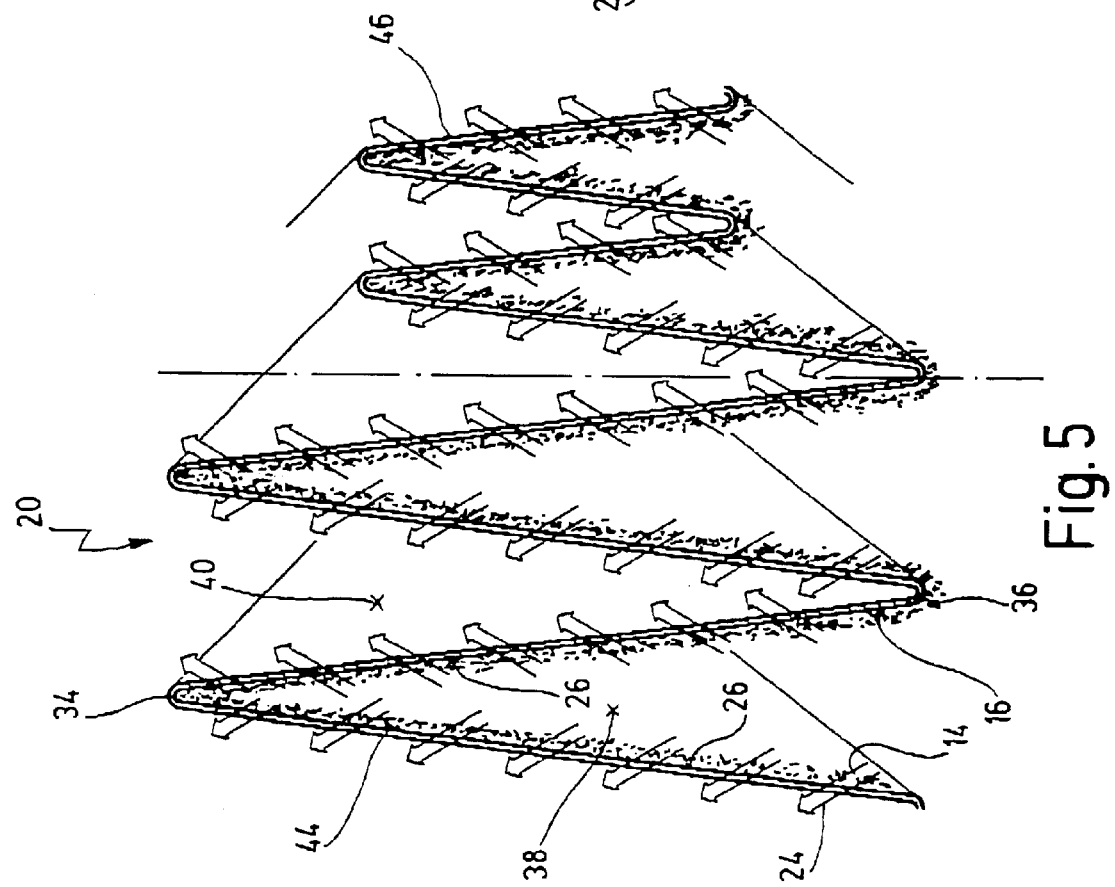
FIG. 5 shows an illustration of a section of the filter with four adjacent filter surfaces in a view onto the outer circumference of the filter in the left half of FIG. 5 and in a view onto the inner circumference in the right half of FIG. 5, each illustration given in a plane.

The upper edges 34 and the lower edges 36 of the filter 20, where the individual filter surfaces are connected to one another in pairs, are formed to be rounded as illustrated in FIG. 5.

The filter body 28 thus comprises a meander structure on the whole defined by the arrangement of the filter surfaces 26. The filter surfaces 26 and therefore the filter body 28 are fabricated from the same material, in the present case from a metallic multi-layer fabric. The meander-shaped filter body 28 is produced by folding a circular blank of starting material along radial folding lines, which then define the upper fold edges 34 and the lower fold edges 36. Five to eight such folded blanks are then arranged adjacent to one another to form the circular filter body 28 and are adhered or welded to one another at the connection points.

Other materials for the filter 20 can also include single layer metal fabrics, glass-paper composite materials or synthetic fabrics.

As can be taken from FIG. 4, each filter surface 26 tampers in radial direction from the outside to the inside, so that each individual filter surface 26 has the approximate form of a trapezoid, whose symmetry axis runs substantially horizontal.

A ratio of the height h to the radial extension of the filter surfaces 26 is smaller than 1 and lies in the range of about 0.1 to 0.5. The filter 20 is thus small in height and occupies a correspondingly small vertical space in the apparatus 10 in FIG. 1. The filter 20 thus descends to only a small depth into the processing chamber 12 of the apparatus 10 in FIG. 1.

Due to the fact that the individual filter surfaces 26 tamper in radial direction from the outside to the inside, an inclination angle α (FIG. 2) between two respectively neighboring filter surfaces 26 remains substantially constant over the radial extension of the filter surfaces 26, so that the individual filter surfaces 26 in radial direction are flat and twist free.

An intermediate space 38 facing the process air 14 containing the particulate material 16 and an intermediate space 40 facing the exhaust chamber 22 are formed between neighboring filter surfaces 26. Each intermediate space 38 has an approximately V-shaped cavern or steep roof shape in crosssection due to the meander-like structure of the filter body 28.

Figure 6:
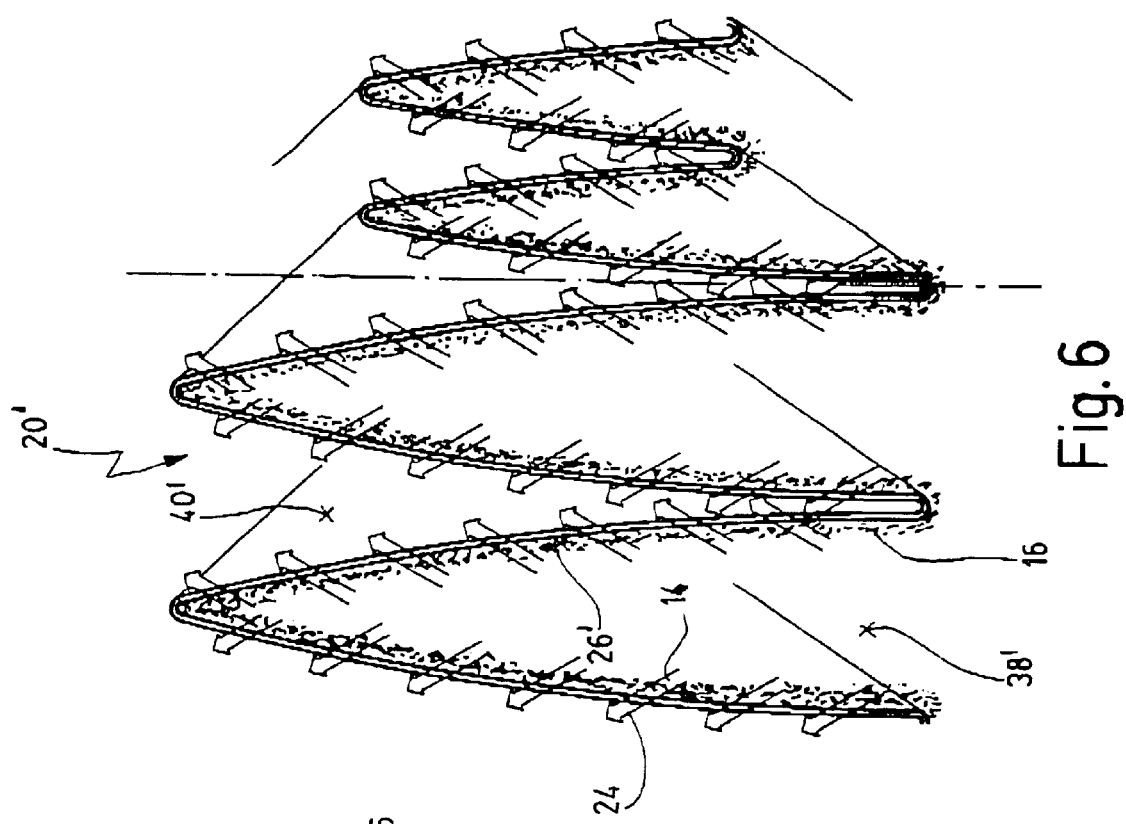
FIG. 6 shows an illustration corresponding to FIG. 5 of an embodiment of the filter slightly modified from that in FIG. 5.

In the slightly modified embodiment of the filter 20' shown in FIG. 6, the filter surfaces 26' are curved to be concave as seen in the flow direction of the process air 14, so that the intermediate space 38' on the side of the process air is enlarged compared to the intermediate space 40' on the purified air side. With this configuration of the filter surfaces 26', the flow velocity of the process air 14 in the intermediate space 38' is reduced compared to the intermediate spaces 38 in FIGS. 2 to 5. Consequently, the particulate material 16 strikes the filter surfaces 26' with a lower velocity and a smaller portion of the particulate material 16 adheres to the filter surfaces 26'.

Figures 7, 8:
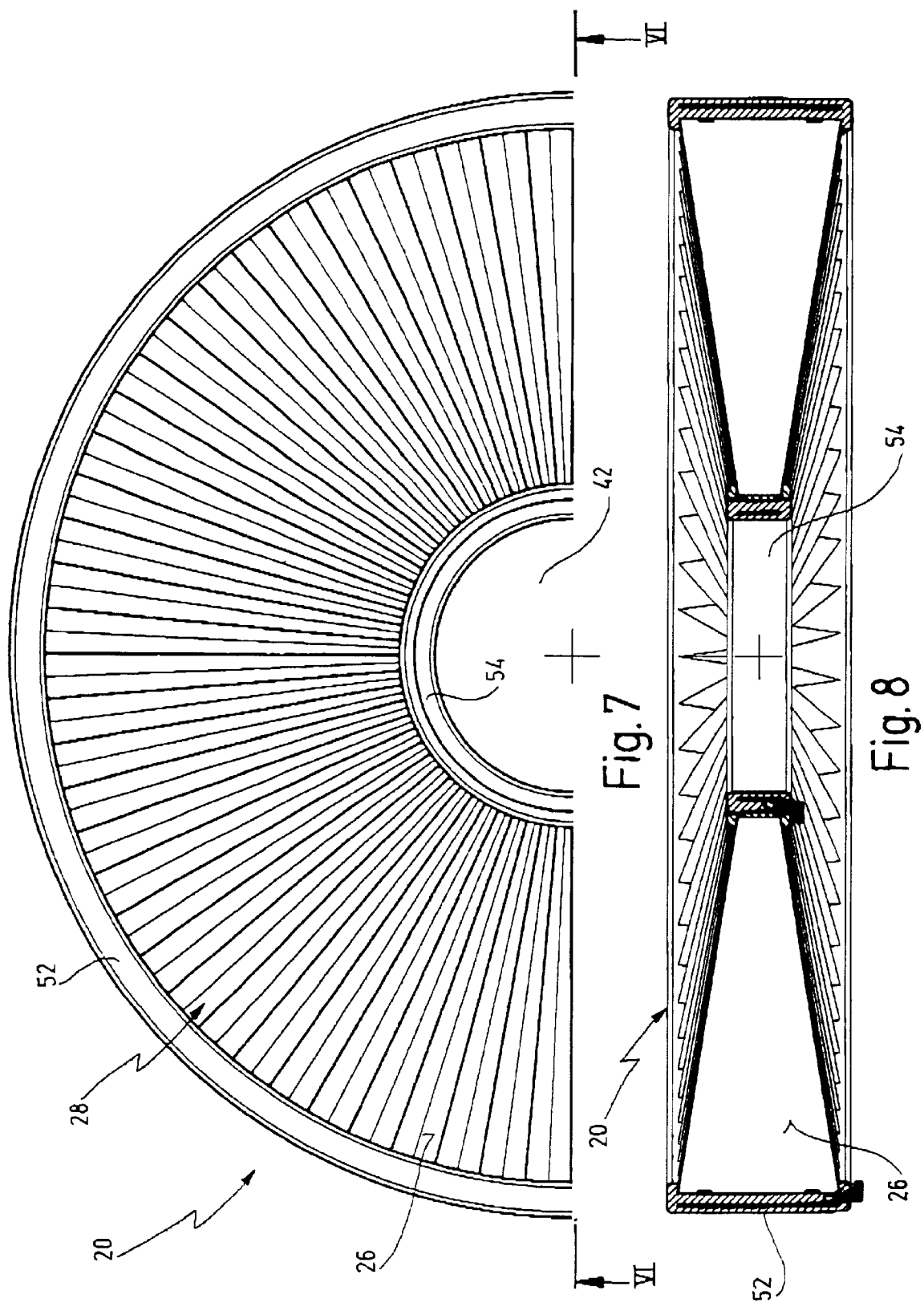
FIG. 7 shows a plan view of half of the filter taken along the line VI—VI where a first seal and a second seal is provided on the filter.
FIG. 8 shows a cross-section of the filter along the line VI—VI with the mentioned seals.

As best seen in FIG. 7, the filter 20 comprises an opening 42 at its center, which is suitably closed in operation of the apparatus 10, as will be described below in more detail.

The intermediate spaces 38 and 40 between the neighboring filter surfaces 26 and also the intermediate spaces 38' and 40' of the filter 20' in FIG. 6 are radially open at the outer circumference, i.e. at the outer end edges 44 and also at the inner circumference, i.e. at the inner end edges 46 (see FIG. 4).

The end edges 44 at the outer circumference of the filter 20 are connected to one another by two narrow rings 48, 50 formed as ring bands, where the rings 48, 50 have a smaller width in comparison to the height h of the filter surfaces 26. The rings 48, 50 are adhered or welded to the end edges 44 of the filter surfaces 26, depending on which material is employed for the filter surfaces 26. As can be taken from FIG. 9, recesses are provided in the filter surfaces 26 at their end edges 44 in which the first ring 48 and the second ring 50 are inserted, so that the end edges 44 together with rings 48, 50 form a smooth outer edge.

Figure 9:
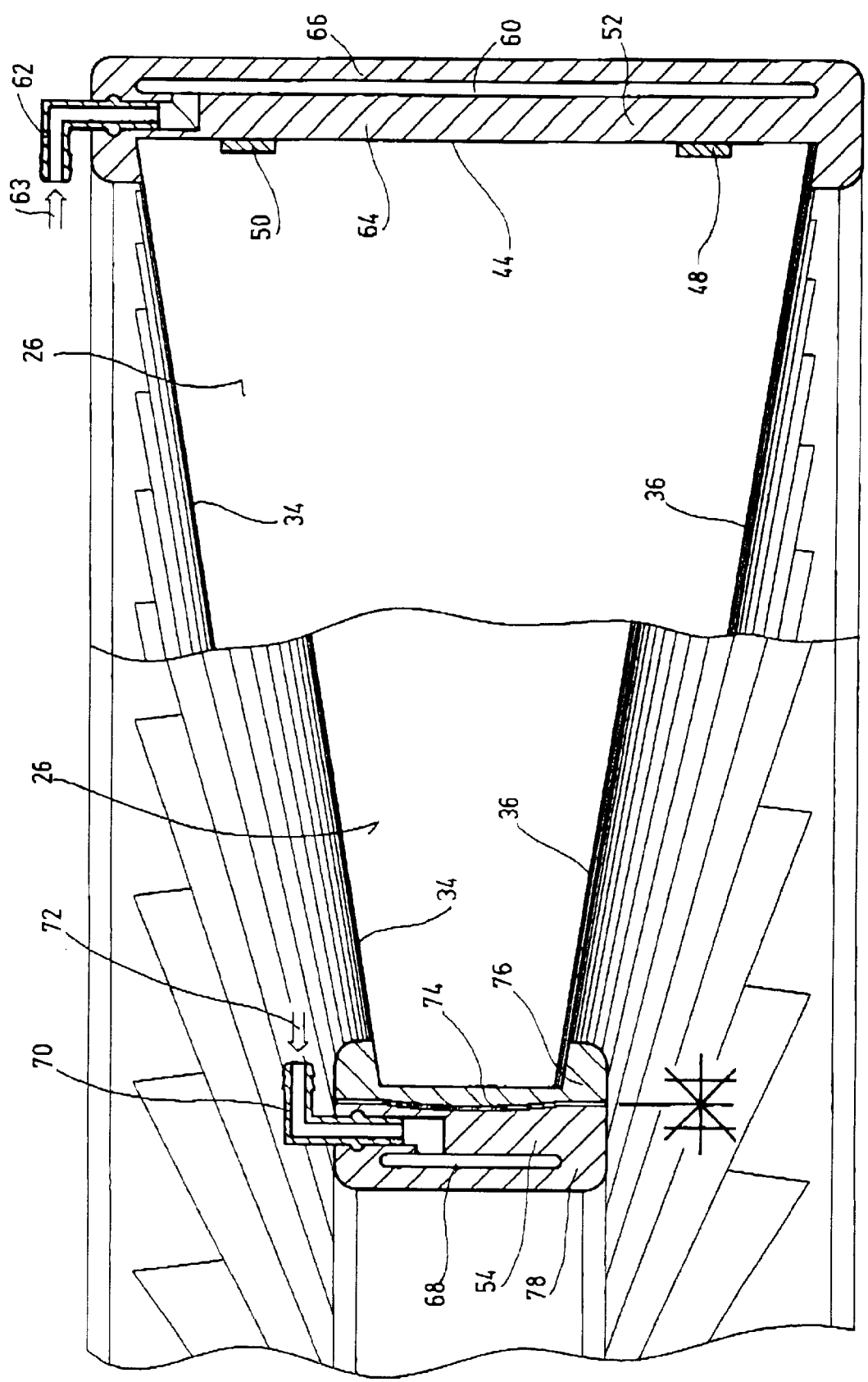
FIG. 9 shows a partial detail illustration of the filter in FIG. 8 with the first seal and the second seal shown in detail.

The filter 20 is shown in FIGS. 7 to 9 with a first seal 52 and a second seal 54, each of which is removal from the filter body 28. The first seal 52 fully surrounds the filter body 28 at its outer circumference, while the seal 54 fully surrounds the filter body 28 at the inner diameter formed by the opening 42.

The first seal 52 seals the filter 20 against an inner wall 56 of the apparatus 10 in the mounted condition of the filter 20. The second seal 54 seals the filter body 28 against a cover including an upper closure plate 58 and a lower closure plate 59 mounted in the opening 42 (see FIG. 1). The first seal 52 and the second seal 54 consist of an elastic material suitable for sealing purposes. The first seal 52 and the second seal 54 are also elastically deformable in the radial direction.

The first seal 52 includes a hollow space 60 which runs circumferentially in the first seal 52 and which can be supplied with compressed air via a connector 62. When the hollow space 60 is supplied with compressed air, an inner radial section 64 and an outer radial section 66 are urged apart. The radial outer section 66 is pressed against the inner wall 56 of the apparatus 10, while the inner radial section 64 is pressed against the end edges 44 of the filter surfaces 26. When the compressed air is released from the hollow space 60, opposite the direction of the arrow 63, the first seal 52 retracts and can be removed from the filter 20.

Correspondingly, the second seal 54 comprises a hollow space 68 running in the circumferential direction in the second seal 54, which can be supplied with compressed air through the connector 70 indicated by the arrow 72.

The second seal 54 further comprises a separation joint 74, which passes through the second seal 54 over the entire circumference of the second seal 54 from the bottom to the top and which subdivides the second seal 54 in two form-fit sections 76, 78. In case of a blow-up of the process air 14 in the processing chamber 12 of FIG. 1, the filter 20 can be shifted along the separation joint 74 into the exhaust chamber 22. A portion of the blow-up energy is dampened by the shifting of the filter 20. The separation joint 74 thus acts as a pre-determined breakpoint in the case of danger.

As can be taken from FIG. 9, the first seal 52 and the second seal 54 partially extend beyond the upper fold edges 34 and the lower fold edges 36 in radial direction. With reference to FIG. 1, the apparatus 10 comprises a compressed air tube 80 which can be connected to the connector 62 of the first seal 52 for supplying the hollow space 60 of the first seal 52. Furthermore, a self-winding reel 81 is arranged in the apparatus 10 for the compressed air tube 80, which maintains the tube 80 under a suitable tension. The connector 62 of the first seal 52 comprises a branch 82, from which a connection tube 84 leads to the connector 70 of the second seal 54. Thus, the first seal 52 and the second seal 54 can be commonly supplied with pressure.

The filtering assembly 18 comprises radially drivable securement elements 86 in the form of carriers for securing the filter 20 in the apparatus 10 lies on the securement elements 86. Three to six elements are provided and distributed about the circumference of the apparatus 10. The securement elements 86 are actuated pneumatically or hydraulically. Each element 86 is connected to a piston located outside of the apparatus 10 in a chamber 90, which can be supplied with compressed air or hydraulic fluid as indicated by the arrow 92 or which can be purged as indicated by the arrow 94. The securement elements 86 are withdrawn radially outwardly to remove the filter 20, where the filter is lowered to the downside by lifting means (not shown).

As shown in FIG. 1, the means 96 for shaking or agitating the filter are arranged in the opening 42 at the center of the filter 20. The agitating means 96 are driven electrically or pneumatically and generate vertical up and down vibrations as indicated by the double arrow 98, which are transferred to the closure plate 58 of the filter 20. The tendency of the particulate material 16 to adhere to the filter surfaces 26 is reduced by the vibration of the filter 20. At the same time, particles 16 already adhered to the filter surfaces 26 are shaken off and fall back into the processing chamber 12.

In a further embodiment, the processing apparatus 10 include a filtering assembly 110 comprising the filter 20 with the first seal 52 and the second seal 54 and the securement elements 86.

Instead of the agitating means 98 of the filter 20 in FIG. 1, the filtering assembly 110 comprises means 112 for clearing off the filter 20, which are arranged above the filter 20, i.e. in the exhaust chamber 22. The clearing means 112 comprise four arms equally distributed about the circumference, of which one arm 114 is shown in front view in FIG. 10 and one arm 116 is shown in a side view. The arms 114 or 116 have a profile configured to generate a pressure wave 117 when rotated above the filter 20. The pressure wave 117 is applied to the upper side of the filter 20, which reverses the flow direction of the process air 14 under the arms 114, 116. The generated counterflow of the process air 14 blows the particulate material 16 from the filter surfaces 26 back into the processing chamber 12. The arms 114, 116 have approximately the profile of an inclined rotor blade. A lower edge 118 of the arms 114, 116 travels closely but without contact to the upper fold edges 34 of the filter 20.

The clearing means 112 of the filter 20 is mounted in the apparatus 10 by means of a support frame 120. The arms 114, 116 are driven by an external motor 122, whose drive shaft 124 is connected to a drive shaft 128 via a transmission 126 in the form of a mitre gear or a straight differential. The drive shaft 128 is connected to a support arm 130 upon which the arm 116 is secured.

Figure 10:
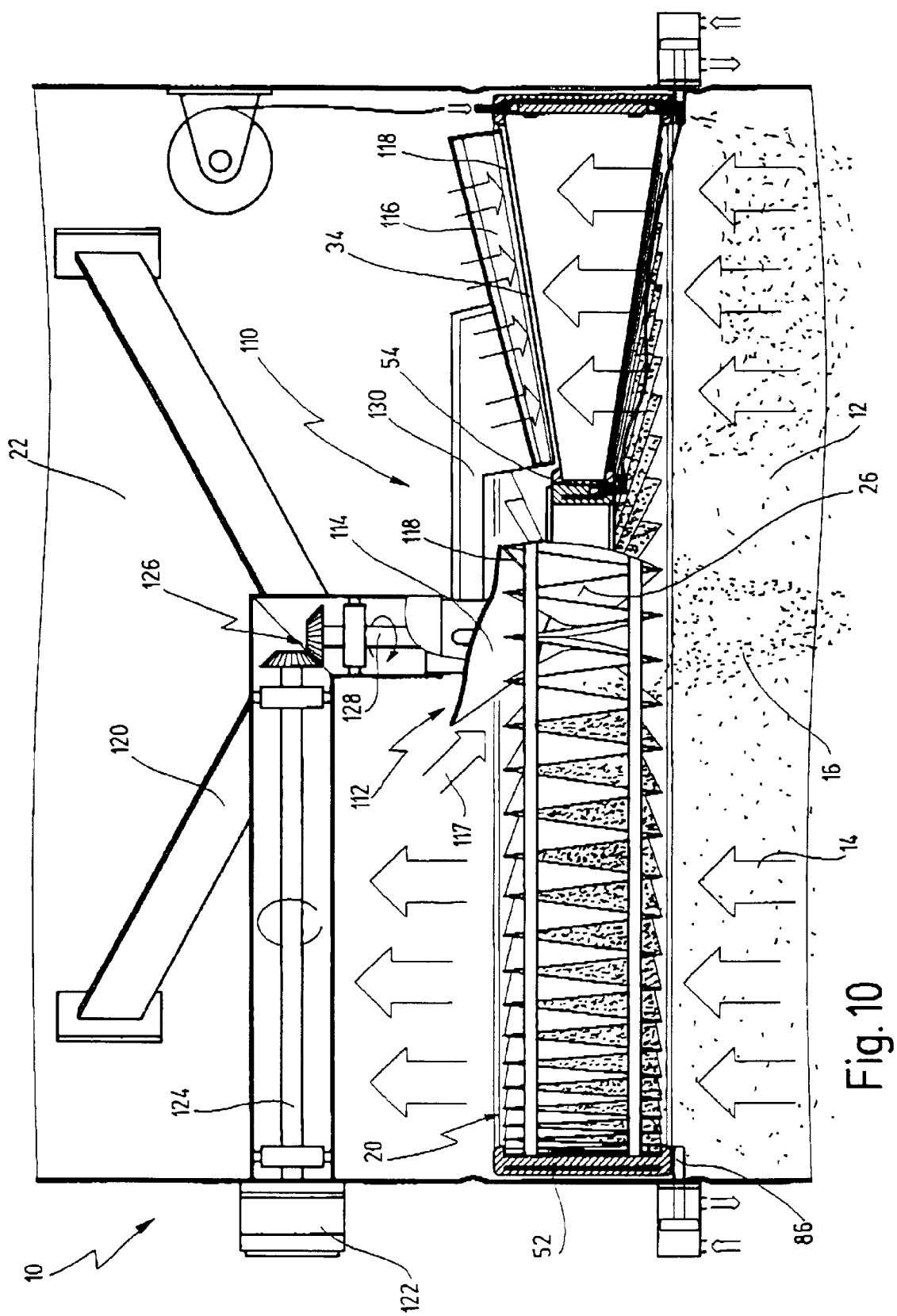
FIG. 10 shows a further embodiment of a processing apparatus employing the filter further including a means for clearing the filter.
Figure 11:
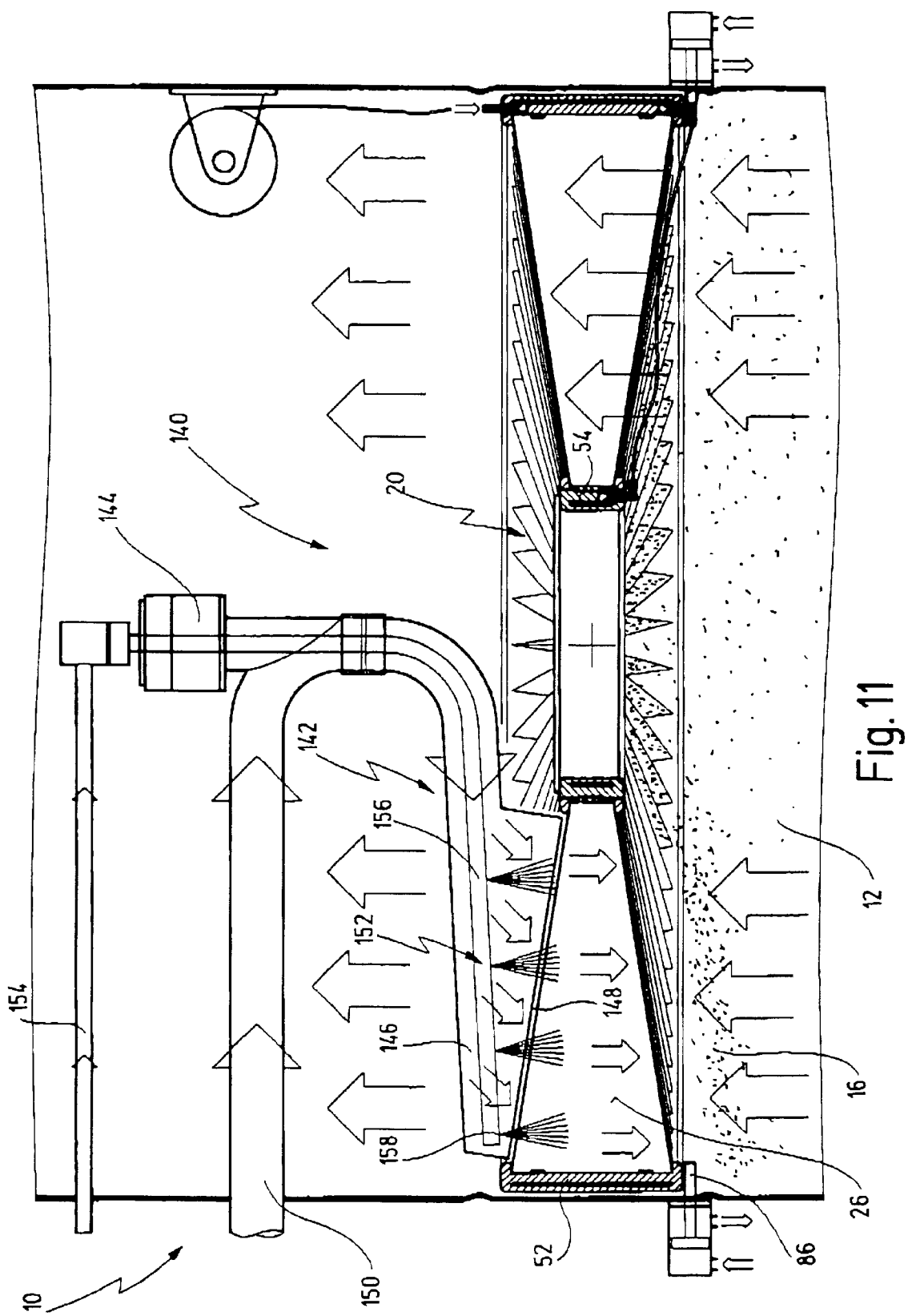
FIG. 11 shows a further embodiment of a processing apparatus whose filtering assembly includes modified clearing means compared to FIG. 10 and additionally washing means for the filter.

FIG. 11 shows a further embodiment of a filtering assembly 140, which also comprises the filter 20 of FIG. 1 or 10 with the first seal 52, the second seal 54 and the securement elements 86. The filtering assembly 140 comprises clearing means 142 for the filter 20, which in contrast to the means 112 are operated with external cleaning air.

The clearing means 142 comprise an arm 146 rotatable by a motor 144, whose underside edge is provided with an outlet opening for the cleaning air. The outlet opening extends substantially over the entire radial extension of the underside edge 148 in the form of a gap or slot. The cleaning air is supplied from an external source (not shown) through a feed channel 150. The particulate material 16 is blown off of the filter surfaces 26 back into the processing chamber 12 by means of the cleaning air exiting from the outlet opening at the underside edge 148 of the arm 146, which has been supplied through the feed channel 150.

The filtering assembly 140 also includes means 152 for washing the filter 20 after completion of a process. The means 152 for washing the filter 20 after the process is integrated with the means 142 for clearing the filter 20 during the process.

The washing means 152 include a feed line 154 for a washing fluid, which is connected to a spray arm 156. The spray arm 156 is integrated into the arm 146 for the clearing means 142 of the filter 20. The spray arm 156 therefore rotates together with the arm 146, so that only one drive is required for this arrangement, namely the motor 144.

The spray arm 156 includes at least one outlet 158 on its underside, where four outlets 158 are present in the embodiment of FIG. 11. After completing a process in the apparatus 10, the filter can be wetted by the washing fluid from the outlets 158 to bind the particulate material 16 onto the filter surfaces 26. In this manner, the particulate material 16 does not fall off when removing the filter and the operating personnel does not come into contact with the material.

The washing means 152 or the outlets 158 of the spray arm 156 can however also be configured such that the washing fluid is emitted from the spray arm 156 under pressure. In this case, the filter 20 in the apparatus 10 is subjected to a cleaning by jet spraying or by means of a surge or gush of the washing fluid. In this manner, a satisfactory cleaning of the filter can be achieved between two subsequent processes, at least when the two processes relate to the treatment of the same particulate material.

It will be understood that the washing means 152 can also be combined with the clearing means 112 in FIG. 10, where a corresponding spraying device for washing liquid is integrated into the arms 114, 116.

What is claimed is:

1. A processing apparatus, in particular a granulating or coating apparatus, comprising:

a processing chamber;

a filtering assembly arranged adjacent said processing chamber for removing dust from process air containing particulate material, said filtering assembly including at least one filter being passed by said process air coming from said processing chamber, wherein said filter comprises a plurality of filter surfaces arranged adjacently to form a substantially circular filter body, said filter surfaces extending substantially radially and being inclined in meander geometry with respect to the flow of said process air, and wherein said filter body and said filter surfaces are made of a metallic multilayer fabric.

2. The apparatus of claim 1, wherein said filter is arranged to lie substantially horizontally above said processing chamber.

3. The apparatus of claim 1, wherein a ratio of a height h to a radial extension of said filter surfaces is smaller than 1.

4. The apparatus of claim 3, wherein said ratio is in the range of about 0.1 to 0.5.

5. The apparatus of claim 1, wherein said filter body and said filter surfaces are composed of a same material.

6. The apparatus of claim 1, wherein each individual filter surface is tapered in radial direction from the outside to the inside.

7. The apparatus of claim 1, wherein intermediate spaces between neighboring filter surfaces are radially open at an outer circumference of said filter.

8. The apparatus of claim 1, wherein at least one ring is connected to end edges of said filter surfaces at an outer circumference of said filter surfaces, wherein a width of said ring is smaller than the height of said end edges of said filter.

9. The apparatus of claim 1, wherein said filter surfaces are curved to be concave in the flow direction of said process air.

10. The apparatus of claim 1, wherein a closeable opening is provided at a center of said filter.

11. The apparatus of claim 1, wherein said filtering assembly comprises exactly one filter whose diameter corresponds approximately to a diameter of said processing chamber.

12. The apparatus of claim 10, wherein drive means for agitating said filter are arranged in said opening of said filter.

13. The apparatus of claim 1, wherein said filtering assembly comprises a first circumferential seal for sealing the outer periphery of said filter against an inner wall of said processing apparatus, wherein said seal is removable from said filter.

14. The apparatus of claim 1, wherein a closeable opening is provided at its center and said filtering assembly comprises a second circumferential seal for sealing the inner periphery of said at least one filter, where the seal (54) is removable from the filter.

15. The apparatus of claim 14, wherein said second seal is radially, elastically deformable and comprises a hollow space supplied with compressed air.

16. The apparatus of claim 13, wherein said first seal is radially elastically deformable and comprises a hollow space supplied with compressed air.

17. The apparatus of claim 15, wherein said second seal has a circumferential separation joint, which allows a vertical shifting of said filter when exceeding a threshold value of a vertically exerted force.

18. The apparatus of claim 16, wherein said first seal has a circumferential separation joint, which allows a vertical shifting of said filter when exceeding a threshold value of a vertically exerted force.

19. The apparatus of claim 1, wherein said filtering assembly comprises radially movable securement elements for securing said filter in said processing apparatus.

20. The apparatus of claim 1, wherein means for clearing said particulate material from said filter during the process are arranged above said filter.

21. Apparatus of claim 20, wherein said clearing means comprise at least one rotatable arm supplied with compressed air, whose length corresponds approximately to the radial extension of said filter surfaces and whose underside comprises at least one air outlet nozzle.

22. The apparatus of claim 1, wherein means for clearing said particulate material from said filter during the process are arranged above said filter and said clearing means comprise at least one rotatable arm having a profile configured to create a pressure wave directed downwardly by rotation of said arm.

23. The apparatus of claim 1, wherein means for washing said filter with a washing fluid are arranged above said filter.

24. The apparatus of claim 23, wherein said washing means comprise at least one rotatable spray arm having at least one outlet on its underside for said washing fluid.

25. The apparatus of claim 1, wherein means for clearing said particulate material from said filter during the process are arranged above said filter and means for washing said filter with a washing fluid are arranged above said filter and wherein said washing means are integrated into said cleaning means.

* * * * *